UNITED STATES PATENT OFFICE.

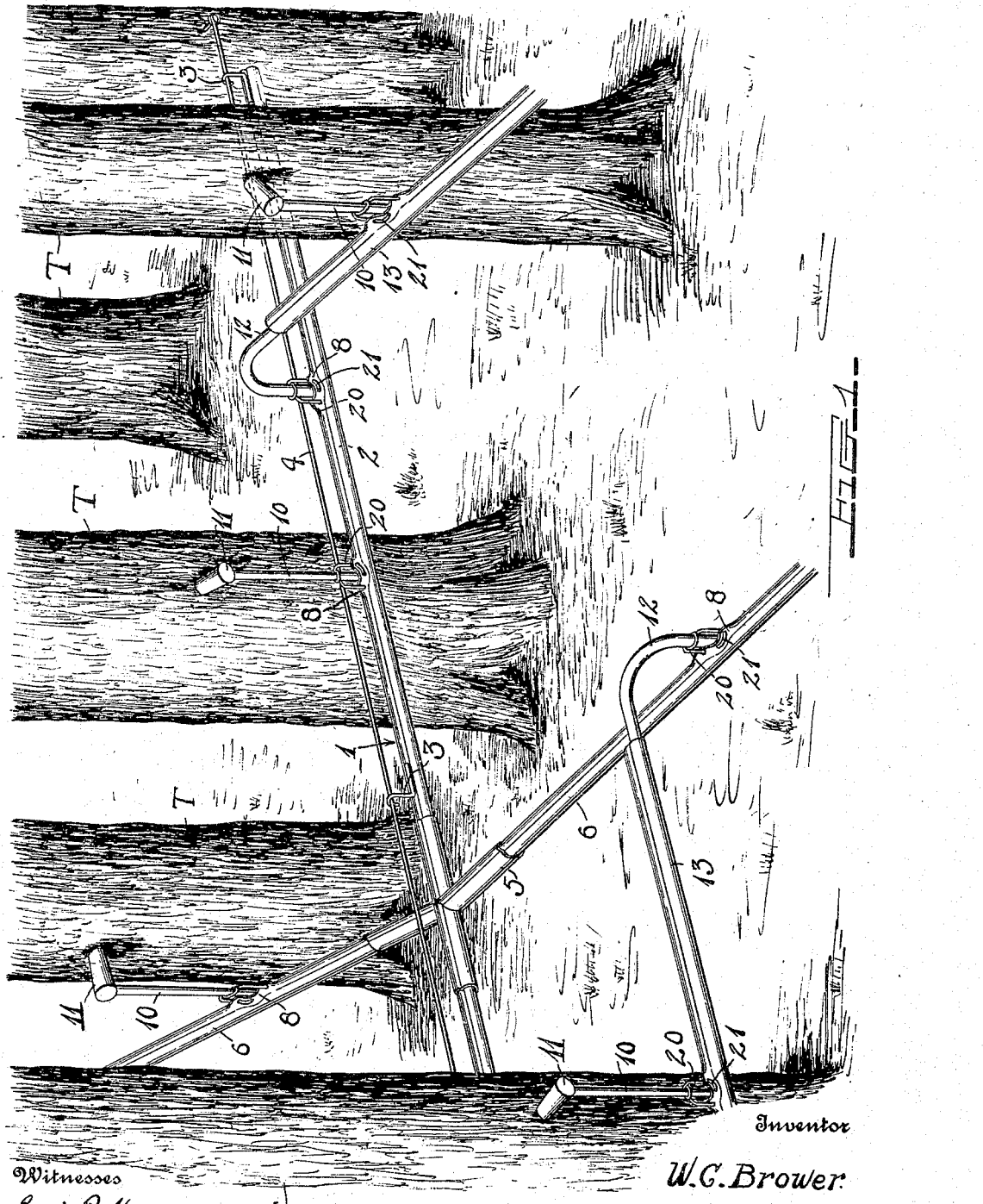

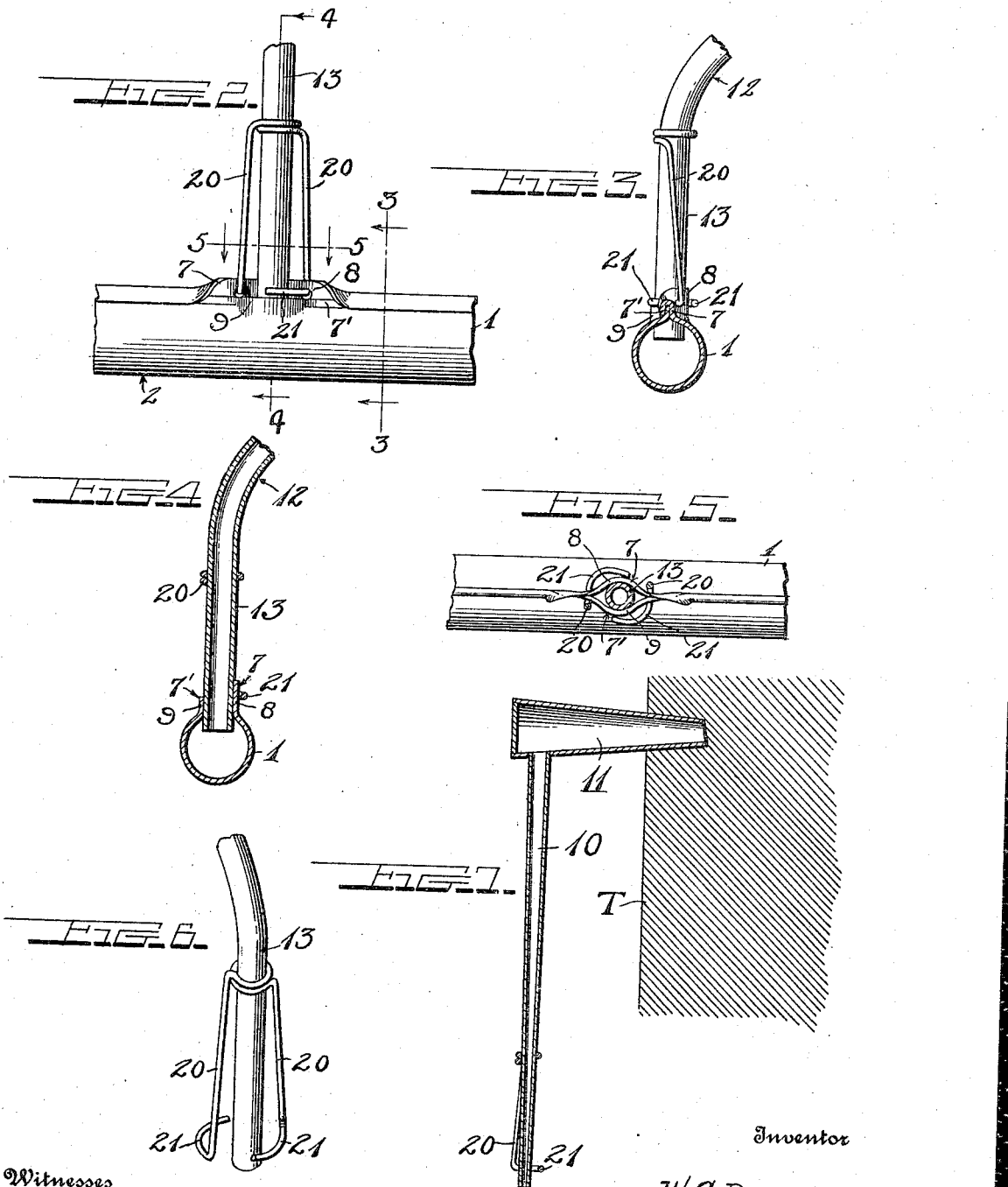

WILLIAM C. BROWER, OF MAYFIELD, NEW YORK.

SAP-COLLECTING SYSTEM.

1,186,741.  Specification of Letters Patent.  Patented June 13, 1916.

Application filed December 17, 1914. Serial No. 877,776.

*To all whom it may concern:*

Be it known that I, WILLIAM C. BROWER, a citizen of the United States, residing at Mayfield, in the county of Fulton and State of New York, have invented certain new and useful Improvements in Sap-Collecting Systems; and I do declare the following to be a full, clear, and exact description of the invention, such as will enable others skilled in the art to which it appertains to make and use the same.

My invention relates to improvements in sap gathering devices and has for its main object, the provision of simple means for tapping trees and conveying the sap to distant points.

In carrying out the above object, a further object of the invention becomes to construct the system in a plurality of detachably connected sections, and to provide novel means for uniting such sections.

With the above and minor objects in view, I employ the novel features of construction and combination herein described and claimed and shown in the accompanying drawings wherein:—

Figure 1 is a perspective view showing the application of a portion of the system to use; Fig. 2 is a detail side view of a portion of the main conduit and an end view of one of the branch conduits, showing the manner of connecting the two; Fig. 3 is a vertical transverse section through the main conduit as seen on the line 3—3 of Fig. 2 and showing a side elevation of one of the branch conduits and its connection with the main conduit; Fig. 4 is a transverse section as seen on the line 4—4 of Fig. 2; Fig. 5 is a horizontal section taken on the line 5—5 thereof; Fig. 6 is a perspective view of the lower end of one of the branch conduits and the attaching means thereon; and Fig. 7 is a detail vertical section showing more particularly the construction of one of the spiles and the parts coacting therewith.

In these drawings, forming a part of the present application, the numeral 1 designates a main line conduit which is formed in a number of detachably connected sheet metal sections 2, certain of these sections being equipped with hooks 3 which rise therefrom and which are adapted to be engaged with a wire 4 which is stretched tightly through the grove of sugar maples, from which sap is to be drawn. At various points, four-way couplings 5 may be provided for the attachment of branch conduits 6 which extend laterally from the main conduit 1. If desired, T-couplings or elbows (not shown) may also be provided for tapping the main line at suitable points, whereby branch conduits 6 may be led from said main line to practically any part of the grove.

As most clearly seen in Figs. 2, 3 and 4, the various sections of the main line are constructed of single longitudinal strips of metal which are bent to form a tubular structure, the edges of the strips being united by curling one edge 7 over the other edge 7'. The couplings 5, or other forms of couplings employed, are also constructed in the same manner as clearly indicated in the drawings.

At various points spaced along the main line 1 and along the branch conduits 6, the edges 7 of the metal strips of which these parts are constructed, are bent upwardly to provide flanges 8, which flanges lie in parallel relation to the other upstanding edges 7' of these strips, and are bowed laterally at their centers to coact with similarly laterally bowed portions 9 on said edges 7', to form substantially circular inlet openings in the various pipes. As seen more particularly in Fig. 1, these openings may be provided for receiving upright branch tubes 10 whose upper ends are provided with spiles 11 to be driven into the trees T, or for the attachment of the downwardly curved ends 12 of branch pipes 13 which are also provided with such openings for the attachment of the tubes 10 carrying the spiles 11. It will likewise be seen, by reference to this figure, that these branch pipes 13 may well be connected to the branch pipes 6, for the purpose of leading a line to a tree or trees which would otherwise be inaccessible. In most cases, it becomes expedient to provide whereby the branch pipes may be connected one with the other and whereby said branch pipes may be connected to the main line 1. For this purpose, any part of the device which is to be inserted between the flanges 8 and 9 at an opening, such as a branch 13 is provided with an attachment which comprises a piece of wire having a coil formed therein intermediately of its ends and which encircles the member 13 and is then bent at right angles to form a pair of arms 20 which are spaced from the lower ends of the member 13. The lower ends of said arms are bent laterally and curved outwardly to provide retaining fingers 11 which extend in opposite directions, and are attached to flanges 8 and 9 by turning the fingers in the proper direction to pass them through openings in said flanges, thereby preventing the dislocation of these parts. From the structure just described, it will be seen that the arms 20 and fingers 21 constitute hooks or releasable means for securing the various parts of the device together.

The device constructed substantially as above described, may be employed to great advantage for conveying sap from the trees tapped, to a suitable receptacle (not shown) and this sap will be protected against the entrance of deleterious matter and likewise against injury by storms. Furthermore, the labor of collecting the sap is greatly reduced by the use of such a system, therefore lowering the cost of producing materials made from the syrup or sap.

I claim:

1. A connection between a main and a branch conduit, one of which has an opening in its upper face adapted to receive the other, upstanding flanges surrounding said opening and forming keepers, said flanges having apertures therein, the other conduit extending into said opening and provided with a pair of arms spaced laterally from the lower end of the conduit and secured thereto at their upper ends, the lower ends of said arms being bent laterally and curved to provide retaining fingers adapted to pass through the openings in said flanges, whereby the branch and main conduits may be quickly and detachably connected.

2. A connection between a main and a branch conduit, one of which is formed of a metal strip bent to form a tubular structure with the edges thereof united by curving one edge over the other, openings formed in said conduit at various points in the seam thereof, the edges of the seam being opened to form the openings, and said open edges being bent to form oppositely bowed upstanding flanges, said flanges being provided at their meeting points with registering apertures, the branch conduits having their ends loosely mounted in said openings and provided with laterally extending curved fingers extending in opposite directions for engaging the apertures in the fingers.

3. The combination with a conduit having an opening surrounded with an upstanding flange provided with oppositely disposed apertures, and another conduit for insertion in said opening, a device for securing said conduits together comprising a strip of wire bent to form a coil which encircles the second conduit and which is extended to form parallel arms disposed on opposite sides of said conduit and having their lower ends bent laterally and curved outwardly to provide retaining fingers, the free end of one finger extending in one direction and the free end of the other in the opposite direction, said fingers extending through the apertures, in said flanges, whereby the conduits are detachably connected.

In testimony whereof I have hereunto set my hand in presence of two subscribing witnesses.

WILLIAM C. BROWER.

Witnesses:
Wm. C. Mills,
M. E. Hammond.

Copies of this patent may be obtained for five cents each, by addressing the "Commissioner of Patents, Washington, D. C."